Nov. 22, 1966 D. L. SLOTNICK 3,287,703

COMPUTER

Filed Dec. 4, 1962 8 Sheets-Sheet 1

WITNESSES
Theodore F. Wrobel
Dean Schron

INVENTOR
Daniel L. Slotnick
BY Ernest P. Klipfel
ATTORNEY

Nov. 22, 1966 D. L. SLOTNICK 3,287,703
COMPUTER
Filed Dec. 4, 1962 8 Sheets-Sheet 3
Fig. 4.
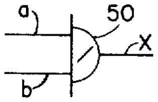
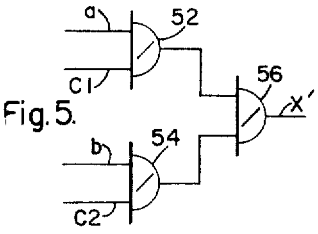
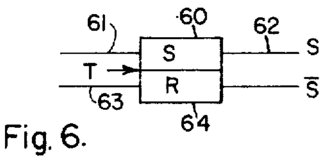
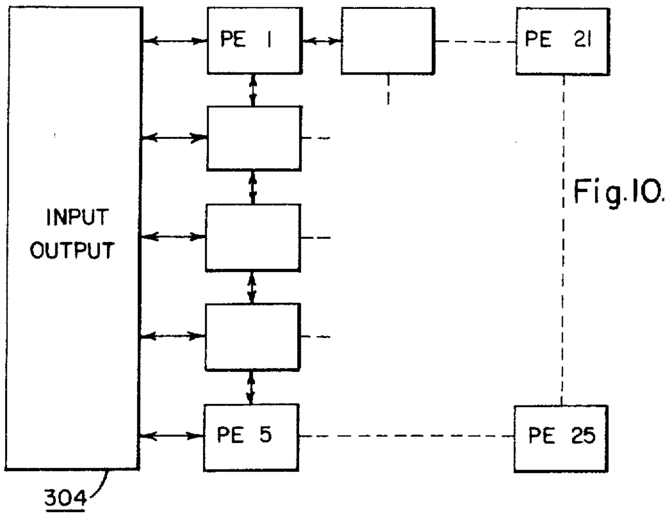
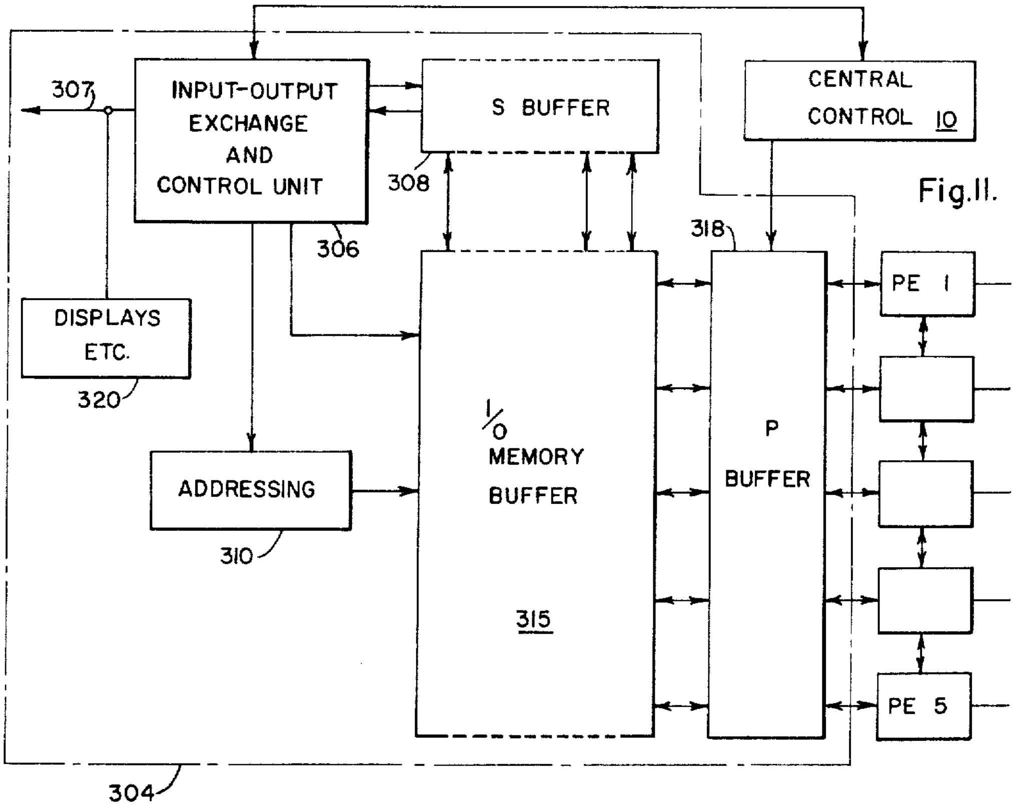

Nov. 22, 1966 D. L. SLOTNICK 3,287,703

COMPUTER

Filed Dec. 4, 1962 8 Sheets-Sheet 4

Nov. 22, 1966 D. L. SLOTNICK 3,287,703

COMPUTER

Filed Dec. 4, 1962 8 Sheets-Sheet 6

Nov. 22, 1966 D. L. SLOTNICK 3,287,703

COMPUTER

Filed Dec. 4, 1962 8 Sheets-Sheet 7

United States Patent Office 3,287,703
Patented Nov. 22, 1966

3,287,703
COMPUTER

Daniel L. Slotnick, Baltimore, Md., assignor to Westinghouse Electric Corporation, Pittsburgh, Pa., a corporation of Pennsylvania Filed Dec. 4, 1962, Ser. No. 242,234
8 Claims. (Cl. 340—172.5)

This invention in general relates to computers, and more in particular to a computer having similar functional processing elements under the supervision of a central control unit.

Modern day digital computers are severely hampered in the solution of a great many mathematical problems in that the memory portion of these computers are utilized as primary storage for both the program to be run by the computer and all of the data to be processed by the computer. There is then a consequent data "traffic" problem on the wires carrying information from and to the memory unit and the other various units of the computer. The aforementioned mathematical problems such as the solution of linear systems, matrices calculations, and solutions of systems of ordinary and partial differential equations, are encountered in such technical areas as information and communication, guidance and control, orbit calculations, radar data processing, weather forecasting, and character recognition problems, to name a few. These problems are best adapted to be solved by a parallel type of computation rather than a time consuming serial type of calculation. To this end there there has been proposed a parallel type computer wherein a central control unit will simultaneously control a plurality of individual and similar computing elements. One such type of computer is described in the Proceedings of the IRE, October 1958, and is entitled, "A Computer Oriented Toward Spatial Problems," by S. H. Unger. In that article there is shown a computer wherein a master control sends orders to a rectangular array of similar modules each of which is able to communicate with its four immediate neighbors. Each module described therein contains a one bit accumulator and a limited amount of memory storage. In addition, there is provided logic circuitry for performing only logic operations such as AND and OR. In the operation of the computer, individual sources of binary input information are connected respectively to supply signals to the individual logic modules. These sources are in spaced physical locations, with the relative positions of the input sources corresponding respectively to the positions of the associated modules in the array. In another embodiment information is fed into the modular array through a module in the lower left corner of the array which information is then shifted across the modules of the bottommost row of the array, it is then brought up one row and shifted across, and which process is continued until information may be retrieved, or transferred out of the array from the upper right module. Although the computer described is adequate for solving spatial problems as well as problems in the field of pattern recognition, it does not lend itself to the flexibility involved in the solution of complex mathematical operations. In addition, the necessity for providing a separate input source for each individual module can greatly increase the cost and complexity of a large array. In the alternative method of inputting information the process of loading information into a single module, and extracting information from a single module, greatly increases the time necessary to load information into an entire array.

It is therefore a primary object of the present invention to provide a computer which is faster than those heretofore.

It is another object to provide a computer having an array of similar modules or processing elements, which is better adapted to solve complex mathematical problems.

It is a further object to provide an electronic computer including an array of similar modules, or processing elements, which may be loaded and unloaded with information in a manner faster than known heretofore.

Yet another object is to provide an electronic computer having an array of processing elements with each processing element having greater flexibility of operation than known heretofore.

It is another object to provide a processing element for a computer which processing element, can not only make logical decisions, but compute mathematically as well.

Another object is to provide a processing element having a plurality of multiword, multibit memory frames.

It is another object to provide a processing element which will operate on operands, or their complements, stored within itself or within another processing element.

Still a further object is to provide a processing element for a computer, which processing element may transfer information between a plurality of memory frames within the processing element.

Briefly, in accordance with the above objects, there is provided a plurality of processing elements all under simultaneous control of a central control unit. Each of the processing elements are similar and each includes memory means in the form of a first memory frame capable of storing a plurality of multibit words, and a second memory frame also capable of storing a plurality of multibit words. Means are provided to perform not only logic operations but mathematical operations on the information stored in the memory frames of the processing elements. Means are additionally provided under the control of the central control unit to transfer information between the memory frames or to write the results of any logic or arithmetic operation in a preselected one of the memory frames. The array is further characterized by the fact that each processing element may communicate, that is, transfer information, to other preselected processing elements in the array. To this end, routing means are provided in each processing element. Information may be loaded into the memories of the processing elements in the array by the provision of input-output means which is connected to a plurality of processing elements which do not possess a full complement of "neighbors." This later plurality of processing elements may be located along an "edge" of the array, if the array is rectangular in form. Information may be extracted from the memories of the processing elements in a similar manner.

The above stated, and further objects of the present invention will become apparent upon a reading of the following detailed specification taken in conjunction with the drawings in which:

FIG. 4 is a diagrammatic representation of a logic element which may be used in the present invention;

FIG. 5 is a diagrammatic representation of one type of gating circuit utilizing the logic device of FIG. 4;

FIG. 6 is a diagrammatic representation of a FLIP-FLOP device;

FIG. 10 is a block diagram of input-output means for loading and extracting information to and from the processing element array;

FIG. 11 is a block diagram illustrating in more detail the input-output system of FIG. 10.

Figure 1:
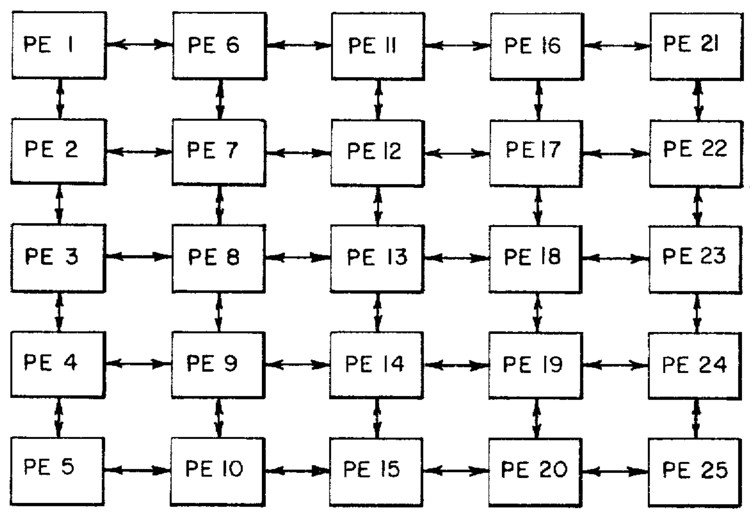
FIGURE 1 is a block diagram illustrating a basic array of processing elements.

Referring now to FIG. 1, there is shown an array of processing elements, with the processing elements labeled PE1 to PE25. Although the square array shown comprises twenty-five processing elements, it is to be understood that more, or fewer, processing elements may be utilized in other predetermined arrays. Each processing element has the ability to communicate with predetermined other processing elements in the array. By way of example, FIG. 1 shows each processing element communicating with its nearest neighbors. In the computer described herein each processing element is under simultaneous control of a central control unit and to this end reference is now made to FIG. 2.

Figure 2:
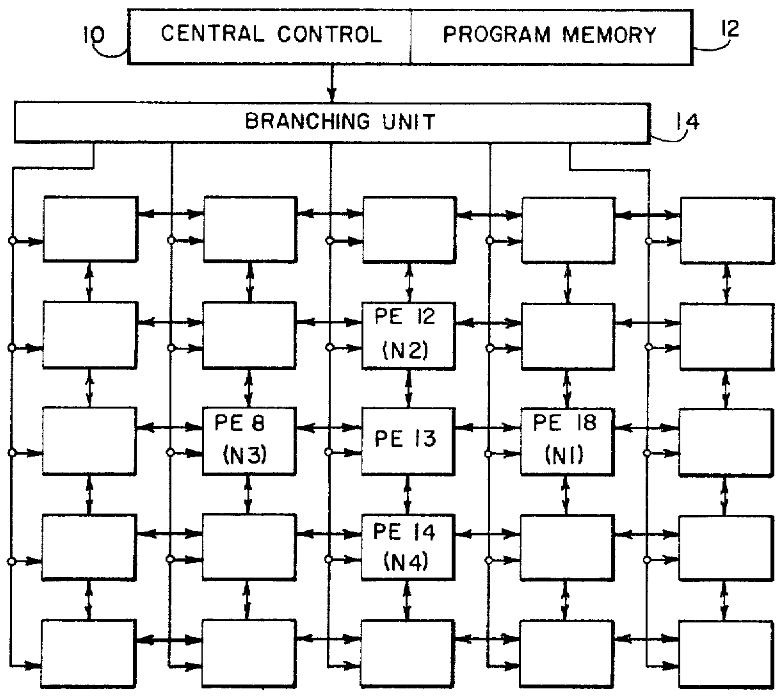
FIG. 2 is a block diagram illustrating the processing elements under simultaneous control of a central control unit.

In FIG. 2 there is shown a central control unit 10 with an associated program memory 12 controlling a plurality of processing elements in a square array. Basically, the central control unit contains program memory 12, has the means to retrieve and interpret stored instructions, and the capability to cause execution of these instructions within the array. At any given instant, every processing elements in the system is performing the same operation on operands stored in the same memory locations of each processing element. These operands however, may all be different as will hereinafter be described. The processing element PE13 shown, has the capability of transferring information to and from its four nearest neighbors PE18, PE12, PE8 and PE14. The processing element to the right will hereinafter be termed its N1 (neighbor 1), the PE directly above will be its N2, the PE to the left will be its N3, and the PE below will be its N4. Thus it is seen that PE18 is the N1 of PE13 and by similar reasoning, PE13 is the N3 of PE18. Since identical control signals are sent to the processing elements from the central control unit, it may be necessary to branch the information and provide proper amplification and power. To this end, there may be provided a branching unit 14 which accepts the signals from the central control unit 10 and transmits it at a higher power level to all of the processing elements in the array.

Figure 3:
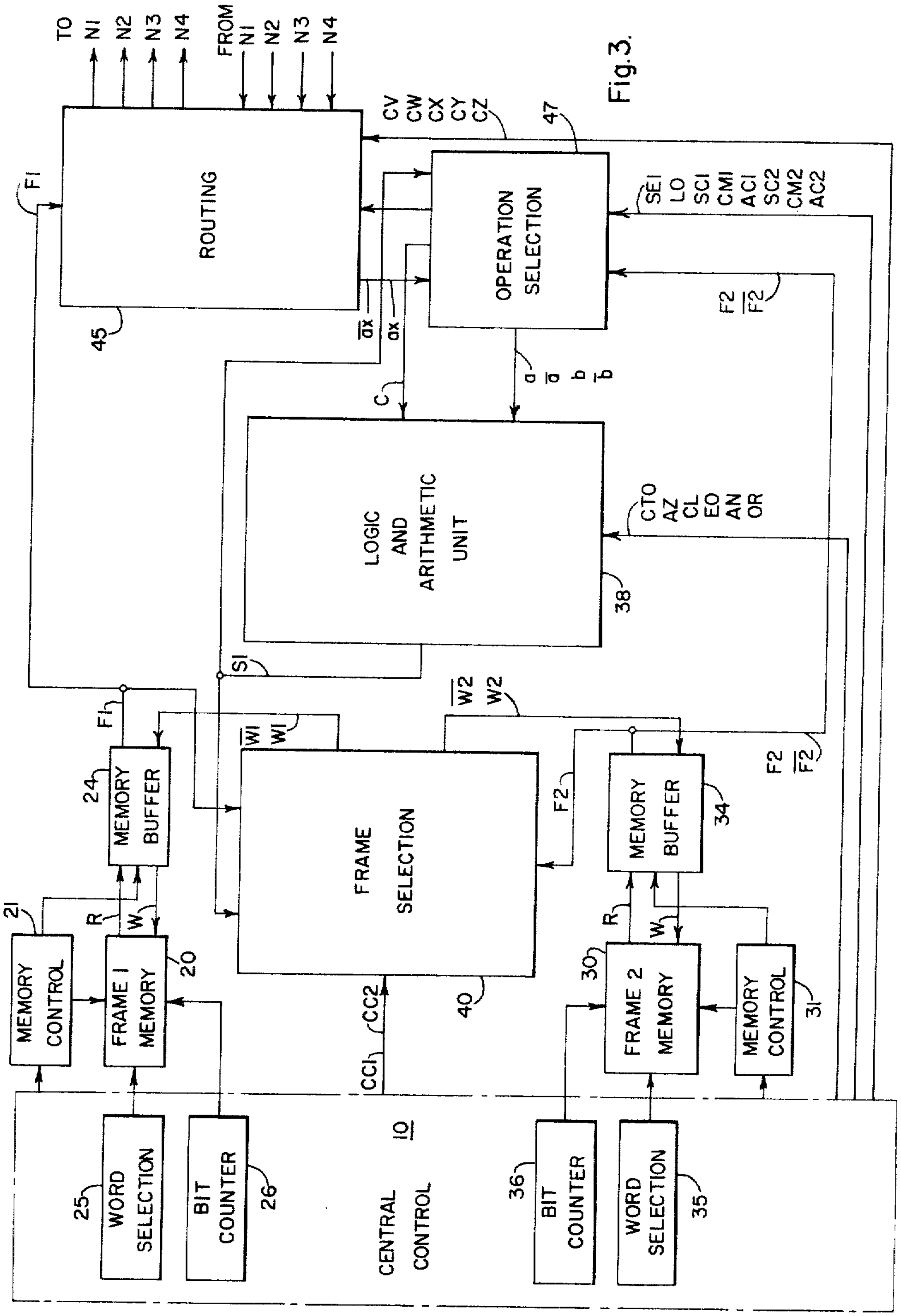
FIG. 3 is a block diagram of a processing element.

Since all of the processing elements in the array are similar, a typical processing elements will be described with respect to FIG. 3. The processing element includes a frame 1 memory 20 and a frame 2 memory 30, with each of these memory frames having the ability to store a plurality of multibit words, and a typical memory has the capacity to store several thousand bits. Associated with the frame 1 memory 20 is a memory control unit 21 and a memory buffer 24. The memory control unit 21 may be operable to supply signals to the frame 1 memory 20 for reading and writing information, in addition to supplying timing and inhibiting pulses to the memory buffer 24. In a like manner memory control unit 31 is operable to control the frame 2 memory 30 in addition to the memory buffer 34. The memory controls 21 and 31 perform their function upon receipt of control signals from the central control unit 10. In order to address the memory frames, there is provided a word selection unit 25 for selecting a predetermined word in the frame 1 memory 20, and a bit counter unit 26 for selecting desired bits in the word selected. The word selection unit 35 operating in conjunction with the bit counter unit 36 in a like manner serve to address the frame 2 memory 30. The word selection units and the bit counter units are diagrammatically shown to be in the central control unit 10. In order to perform desired logic operations and desired arithmetic operation there is provided a logic and arithmetic unit 38 which is capable of performing serial by bit arithmetic operations on information stored in the memory frames. The results of any logic or arithmetic operation may be selectively stored in either frame 1 memory 20 or the frame 2 memory 30. The frame selection means 40 is operable to perform this selective storage operation. The frame selection means 40 is additionally operable to transfer information between memory frames, that is information in the frame 1 memory 20 may be transferred to the frame 2 memory 30, and information in the frame 2 memory 30 may be transferred to the frame 1 memory 20. As was stated, each processing element in the array is capable of communication with other preselected processing elements in the array. Routing means 45 is provided and is operable to route information in the frame 1 memory 20 to the associated processing element or to one of four nearest neighbors upon receipt of predetermined control signals from the central control unit 10. Routing means 45 is additionally operable to receive information from the frame 1 memories of the four nearest neighbors. Although only one routing means is shown which operates to transfer information from the frame 1 memory, it is to be understood that a routing means could also be provided for the frame 2 memory 30. Operation selection means 47 is provided to not only control the logic and arithmetic unit 38 during certain operations but also to pass preselected bits or their complements, involved in the operations, and which bits may be located in the frame 1 memory 20, the frame 2 memory 30, or the frame 1 memory of a neighboring processing element. The various units shown in FIG. 3 are all under control of the central control unit 10 and the various connections shown are labeled with different signals which will be explained hereinafter.

Before explaining the detailed operation of the processing element, reference should be made to FIGS. 4, 5 and 6 which show several types of logic circuits which may be used herein, although it is to be understood that the invention is not limited thereto. FIG. 4 shows a symbol for a STROKE gate which is the common NOT-AND (NAND) circuit. The STROKE gate 50 of FIG. 4 may include a plurality of inputs, of which two are shown, one having the input signal *a* and the other having the input signal *b*; an output signal is indicated as *x*. In familiar binary form, the STROKE gate 50 will provide a ONE output signal if any of its input signals are ZEROS, and will provide a ZERO output signal only if all of its input signals are ONES. The basic STROKE gate 50 of FIG. 4 may be utilized in a gating arrangement shown in FIG. 5 comprising STROKE gates 52, 54 and 56. Assume by way of example that the signals *a*, C1, *b* and C2 are all ZEROS. The STROKE gates 52 and 54 will then be providing ONE signals to the STROKE gate 56 which provides a ZERO output signal. If it is desired to gate one of the signals *a* or *b* such that it appears as an output signal *x'*, a control signal C1 or C2 may be energized to provide a ONE signal. If the signal C1 is made a ONE then the STROKE gate 52 is enabled to pass the *a* signal through to appear at the output *x'*. With the signal C2 being a ZERO, the STROKE gate 54 is providing a ONE input signal to the STROKE gate 56 and if the *a* signal is a ONE the STROKE gate 56 will provide a ONE output signal, and if the *a* signal is a ZERO, the STROKE gate 56 will provide a ZERO output signal. With C1 a ZERO, STROKE gate 52 provides an enabling ONE signal to STROKE gate 56 and by making C2 a ONE, the *b* signal will appear as the output of STROKE gate 56. Thus, it is seen that with the STROKE gating arrangement shown in FIG. 5 either one of the signals *a* or *b* may be passed through to the output *x'* by the application of a proper control signal. FIG. 6 shows a symbol which will be utilized herein to symbolize a FLIP-FLOP device. The FLIP-FLOP 60 is shown to have two sides, a set (S) side and a reset (R) side. A ONE signal on input 61 to the set side will cause a ONE on the output 62, and this output signal is indicated as S. The output 64 from the reset side will then be the complement of the S signal that is, a ZERO. A ONE signal on input 63 to the reset side will cause a ONE on the output 64 and this signal is indicated as $\overline{S}$. With a ONE appearing on output 64, output 62 will then be providing a ZERO signal. Generally, in most electronic computers the pulses, or signals, appearing are synchronized with respect to each other by means of clock pulses generated by a clock within the computer. The FLIP-FLOP 60 is shown to have an additional input T to indicate that some sort of timing, or clock pulse is applied to the FLIP-FLOP, the presence of such timing pulse enabling the FLIP-FLOP 60 to function to provide output signals.

Figure 7A:
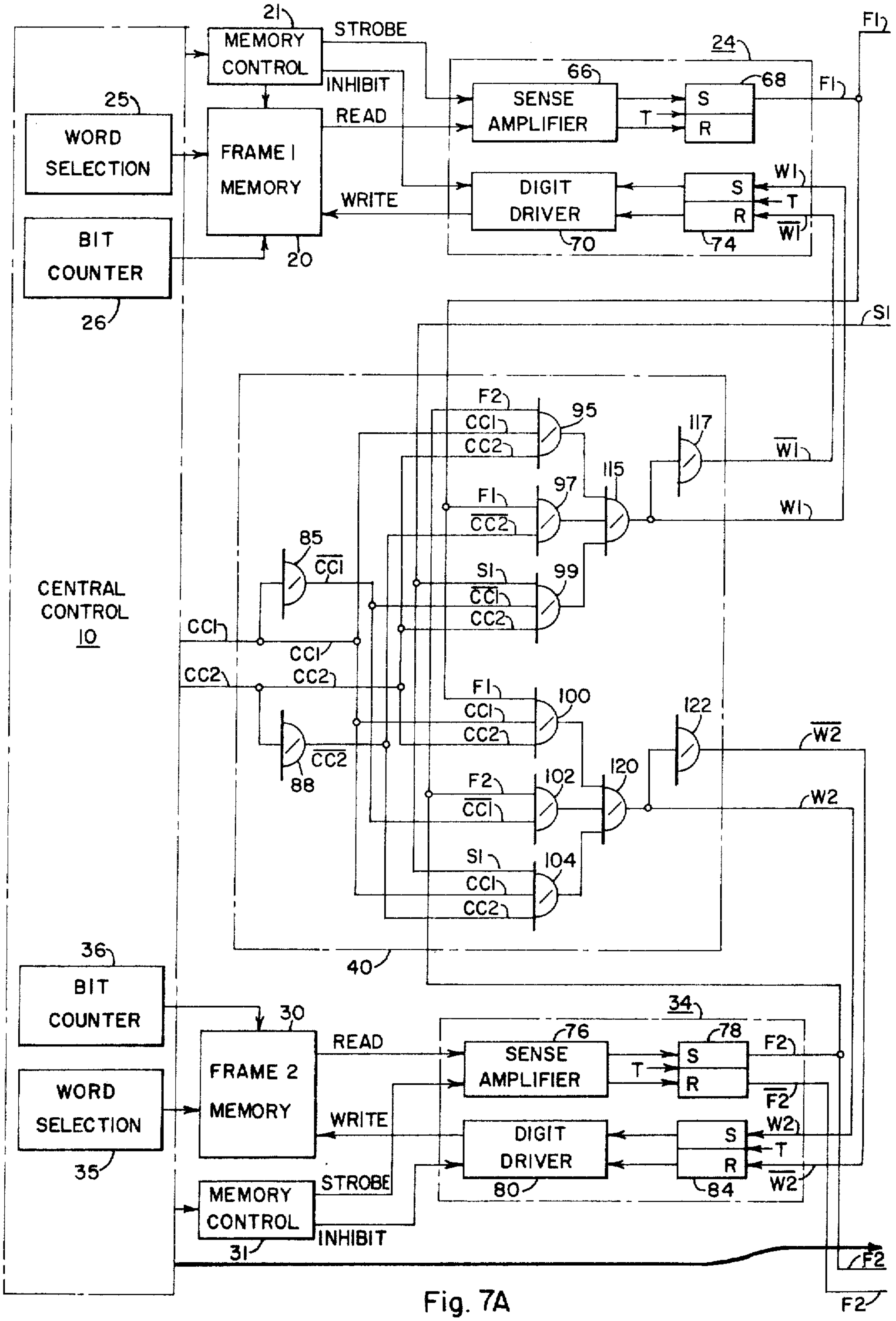
FIGS. 7A, 7B and 7C are schematic electrical diagrams illustrating the processing element of FIG. 3 in more detail.
Figure 7B:
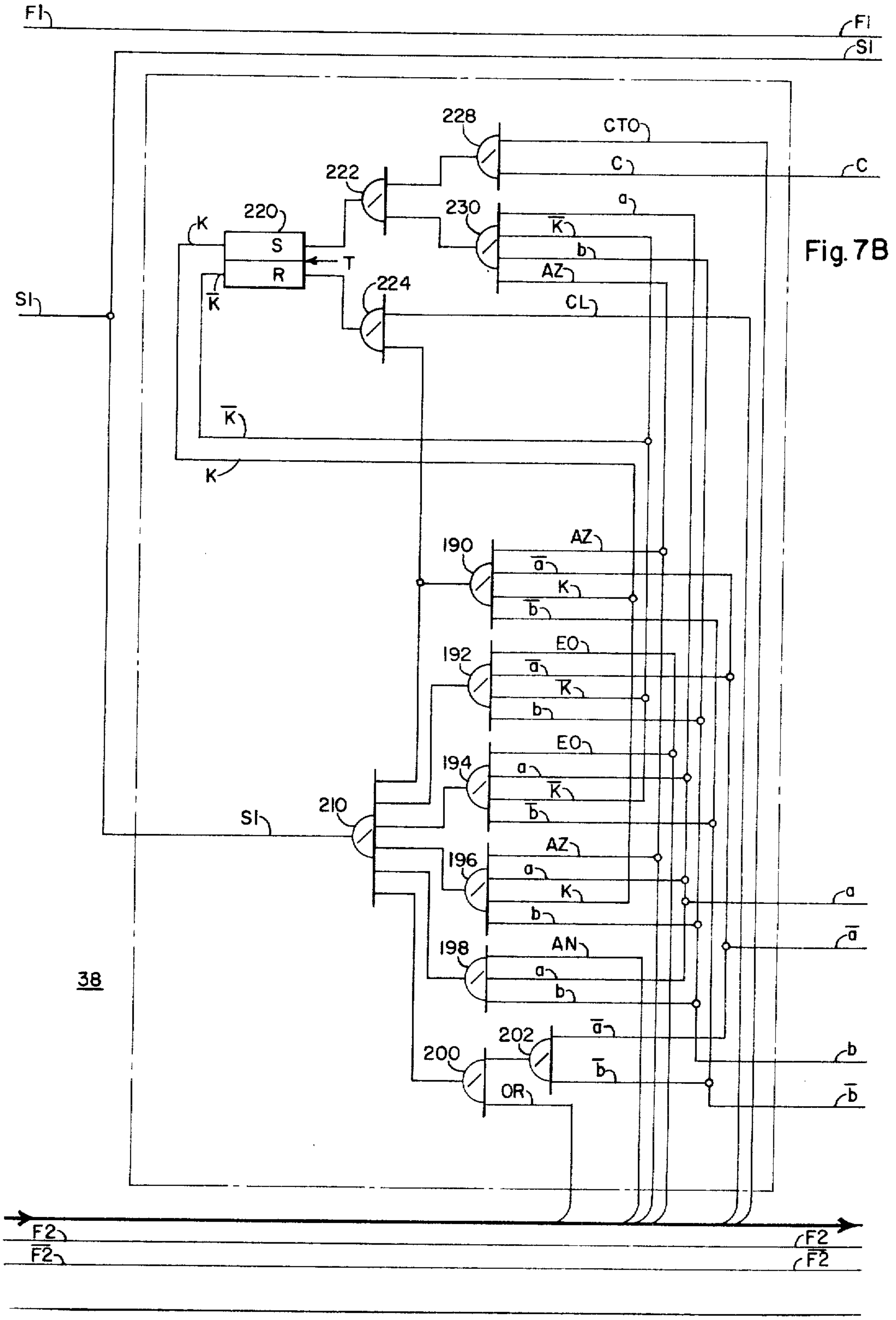
Figure 7C:
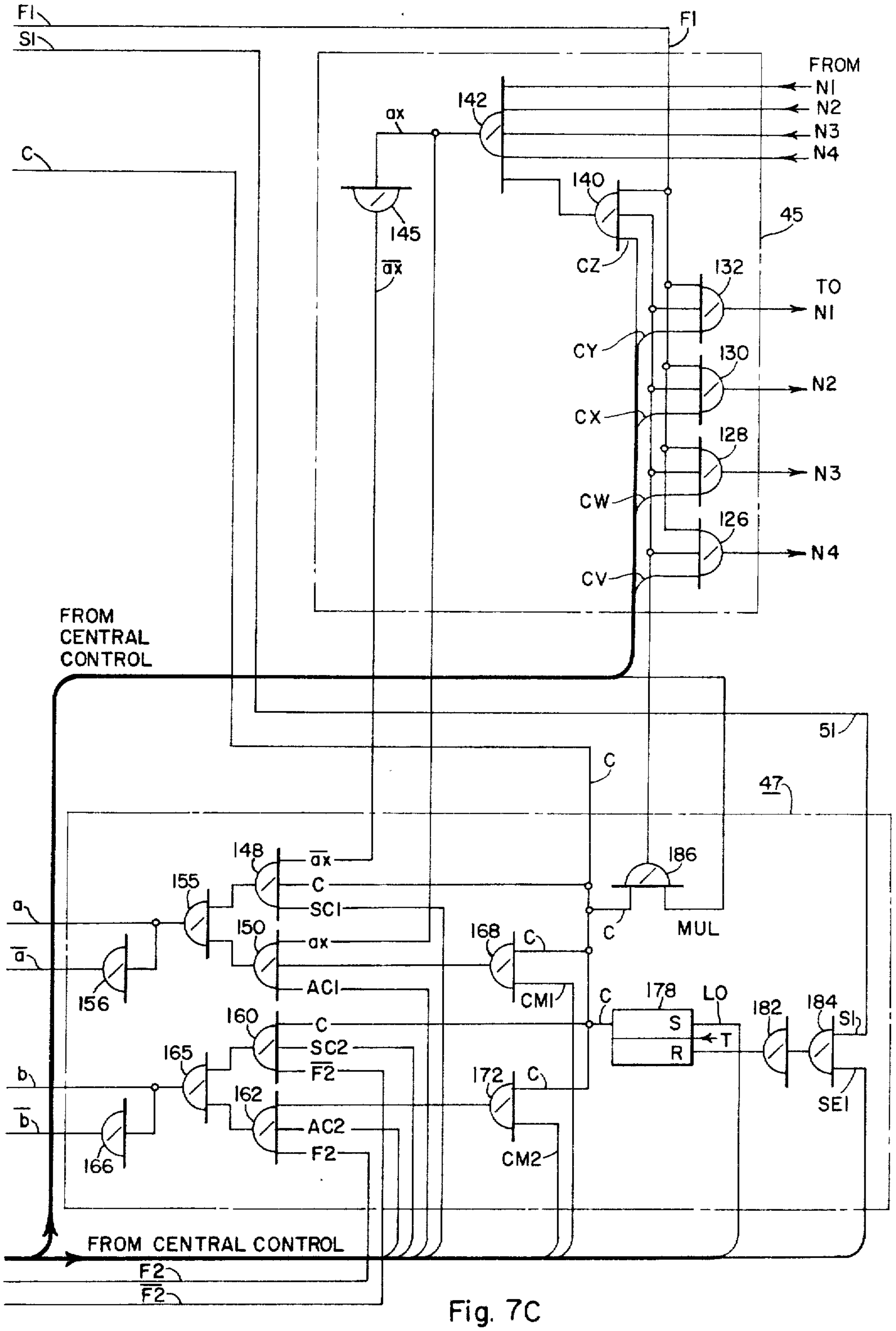

For a detailed explanation of the operation of a processing element, reference should now be made to FIGS. 7A, 7B and 7C which when placed side-by-side in order, constitute a complete circuit of a typical processing element. FIG. 7A shows in more detail the memory buffers 24 and 34, and the frame selection means 40. A predetermined bit in the frame 1 memory 20 is chosen by the word selection unit 25 and the bit counter 26 and when so selected the memory control unit 21 provides the necessary read write wave form. In order to sense the bit being read out of the frame 1 memory 20 there is provided a sense amplifier 66 which is operable, when enabled by a strobe pulse from the memory control unit 21 to sense a bit being read out and cause the FLIP-FLOP 68 to provide this bit as an output signal. The FLIP-FLOP 68 provides the F1 signal and the following notations will be utilized to denote the following signals:

$F1$=the bit read out of the frame 1 memory 20
$F2$=the bit read out of the frame 2 memory 30
$\overline{F2}$=the complement of the bit read out of the frame 2 memory 30
$W1$=the bit to be read into the frame 1 memory 20
$\overline{W1}$=the complement of W1
$W2$=the bit to be read in the frame 2 memory 30
$\overline{W2}$=the complement of W2

In order to write a bit back into the frame 1 memory there is provided to digit driver 70 which is inhibited from operation until the desired time by an inhibit signal from the memory control unit 21. This digit driver will write a bit into the frame 1 memory 20 in accordance with an output from the FLIP-FLOP 74 which output is determined by the W1 input signal to the FLIP-FLOP 74. The memory buffer 34 is similar to the memory buffer 24 in that it comprises a sense amplifier 76 for reading a bit out of the frame 2 memory 30, a FLIP-FLOP 78 for providing the bit read out as a signal F2 and $\overline{F2}$, a digit driver 80 for writing a bit back into the frame 2 memory 30, and a FLIP-FLOP 84 which will be set in accordance with the W2 or $\overline{W2}$ signal to provide the bit for the digit driver 80. In like manner, the sense amplifier is under the control a strobe pulse from the memory control 31 and the digit driver 80 is inhibited from operation until the proper time by an inhibit signal from the memory control 31.

The flexibility of the processing element is greatly enhanced by the fact that the results of any logic or arithmetic operation may be placed in either one of the memory frames 1 or 2 in addition to the fact that information in the memory frames may exchanged with one another. The frame selection means 40 provides the necessary control circuitry to perform the functions in response to the proper predetermined control signals from the central control unit 10. In FIG. 7A there is shown two conductors labeled CC1 and CC2 entering the frame selection means 40. The STROKE gate 85 will provide the complement of CC1, that is $\overline{CC1}$, and the STROKE gate 88 will provide the complement of CC2 ($\overline{CC2}$). A first control signal may be provided by making CC1 and CC2 both ONES. In this instance, the bit read from the frame 1 memory 20 is transferred to the frame 2 memory 30, and the bit read from the frame 2 memory 30 is transferred to the frame 1 memory 20.

As an alternative, a STROKE gate, for example, STROKE gate 95 may be eliminated and information transferred between memory frames 30 and 20 by routing the information through the logic and arithmetic unit 38 as will hereinafter be demonstrated with respect to a multiplication example. A second control signal may be provided by making CC1 a ONE and CC2 a ZERO. In this instance, the results of any logic or arithmetic operation are stored in the frame 2 memory 30 and the bit read out of the frame 1 memory 20 is returned. A third control signal may be provided by making CC1 a ZERO and CC2 a ONE. In this instance, the result of any logic or arithmetic operation is stored in the frame 1 memory 20 and any bit read out of the frame 2 memory 30 is returned. These operations may be demonstrated by making reference to the STROKE gates located within the frame selection means 40. The STROKE gate 95 receives the F2 signal from FLIP-FLOP 78 in addition to the CC1 and CC2 signals. The STROKE gate 97 receives the F1 signal from FLIP-FLOP 68 in addition to the $\overline{CC2}$ signal. The STROKE gate 99 receives the results of any logic or arithmetic operation, designated as S1, in addition to the $\overline{CC1}$ signal and the $\overline{CC2}$ signal. The outputs of STROKE gates 95, 97 and 99 are fed to a STROKE gate 115 which will then provide the W1 signal to the FLIP-FLOP 74, and STROKE gate 117 will provide the $\overline{W1}$ signal to the FLIP-FLOP 74. STROKE gate 100 receives the F1 signal from the FLIP-FLOP 68 in addition to the CC1 and CC2 signals, STROKE gate 102 receives the F2 signal from the FLIP-FLOP 78 in addition to the $\overline{CC1}$ signal, and the STROKE gate 104 receives the S1 signal in addition to the CC1 and $\overline{CC2}$ signals. The outputs from STROKE gates 100, 102 and 104 are fed to STROKE gate 120 which will then provide the W2 signal to the FLIP-FLOP 84, and STROKE gate 122 will provide the $\overline{W2}$ signal to the FLIP-FLOP 84. By way of example, if CC1 and CC2 are both ONES, $\overline{CC1}$ and $\overline{CC2}$ will both be ZEROS. In that instance, STROKE gate 97 receives the $\overline{CC2}$ ZERO signal to provide a ONE signal to STROKE gate 115, STROKE gate 99 receives the $\overline{CC1}$ ZERO signal to provide a ONE signal to STROKE gate 115 and STROKE gate 95 receives CC1 and CC2 both of which are ONES. STROKE gate 95 therefore is enabled and if F2 is a ONE, STROKE gate 95 will produce a ZERO and STROKE gate 115 will produce a ONE. If F2 is a ZERO, STROKE gate 95 will produce a ONE and STROKE gate 115 will produce a ZERO. With CC1 and CC2 both ONES therefore, STROKE gate 115 will reproduce the F2 signal, as was explained with respect to FIG. 5. If F2 is a ONE, STROKE gate 115 will produce a ONE to set the FLIP-FLOP 74 to read a ONE into the frame 1 memory 20 and if F2 is a ZERO, STROKE gate 115 will produce a ZERO and STROKE gate 117 will produce a ONE to reset the FLIP-FLOP 74 to read a ZERO into the frame 1 memory 20. By examining the signals on STROKE gates 100, 102 and 104, it may be seen that STROKE gate 120 will reproduce the F1 signal to set the FLIP-FLOP 84 such that the F1 signal is read in the frame 2 memory 30. Thus, the processing element described herein has the capability to transfer information between memory frames. With CC1 a ONE and CC2 a ZERO, STROKE gates 95 and 99 both produce ONES as the inputs to STROKE gate 115. The $\overline{CC2}$ signal appearing on STROKE gate 97 enables it to pass the F1 signal through and therefore the STROKE gate 115 will reproduce the F1 signal which is written into the FLIP-FLOP 74 and then into the frame 1 memory 20. By examining the signals appearing on the STROKE gates 100, 102 and 104 it may be seen that the STROKE gates 100 and 102 provide ONES to STROKE gate 120 whereas the combination of the CC1 and $\overline{CC2}$ signals appearing on STROKE gate 104 enables it to pass the S1 signal through such that it is reproduced by the STROKE gate gate 120. FLIP-FLOP 84 is set or reset by the output of STROKE gate 120 or 122 and therefore will assume the same value as the S1 signal which is thereby written into the frame 2 memory 30. In a similar manner it may be demonstrated that with CC1 a ZERO and CC2 a ONE the S1 signal will be written into the frame 1 memory 20 and the F2 signal will be rewritten into the frame 2 memory 30. This selective storage feature greatly increases the flexibility and capabilities of the processing element by allowing the results of any logic or arithmetic operation to be stored in a preselected one of the memory frames.

The bits F1 and F2 as provided by FLIP-FLOPS 68 and 78 may represent the bits of a word stored in the memory frames upon which an operation is to be performed. This operation may be performed in the associated processing element or in the processing element of a neighbor as heretofore described. To this end, reference is now made to FIG. 7C.

In FIG. 7C there is shown the routing means 45 which includes a plurality of STROKE gates 126, 128, 130, 132, 140, 142 and 145. STROKE gate 126 receives a signal CV from the central control, STROKE gate 128 receives CW, STROKE gate 130 receives CX, STROKE gate 132 receives CY and STROKE gate 140 receives CZ. In addition, each of these STROKE gates receives the F1 signal from the FLIP-FLOP 68 of FIG. 7A and a signal from the STROKE gate 186. These signals CV to CZ are normally ZEROS and by selectively making one of them a ONE the F1 bit may be routed to any of the neighbors N1 to N4 or may be routed internally within the associated processing element. By way of example, if CV is made a ONE, STROKE gate 126 is enabled and will pass the F1 signal through to neighbor 4. If CW is made a ONE the STROKE gate 128 is enabled and will pass the F1 signal through to N3. In a similar manner the F1 signal may be selectively passed to N1 or N2. If CZ is made a ONE the F1 signal will be passed by STROKE gate 140 to the STROKE gate 142 which is enabled by virtue of the fact that the signals from N1, N2, N3 and N4 will be ONES. STROKE gate 142 therefore will provide a signal *ax* and STROKE gate 145 will provide the complement $\overline{ax}$. Signal *ax* therefore represents the F1 bit read out of a frame 1 memory either from the associated processing element or a neighboring processing element. In many instances an arithmetic operation may be performed on an operand, or its complement and in order to have the F1 bit and its complement, in addition to the F2 bit and its complement, available for computations there is provided the operation selection means 47 which also receives a plurality of control signals from the central control unit 10. STROKE gate 148 is provided, and receives the signal $\overline{ax}$ from STROKE gate 145, and STROKE gate 150 is provided which receives the signal *ax* from STROKE gate 142. By selectively energizing the other inputs to these STROKE gates, that is, making them ONES, we can selectively choose either *ax* or $\overline{ax}$ to be passed by STROKE gate 155 which will then provide the *a* signal. The inverting STROKE gate 156 will provide the complement of the *a* signal which therefore represents one bit to be operated upon by the logic and arithmetic unit 38. The bit may have originated in the associated processing element or the processing element of a neighbor. The output of FLIP-FLOP 78 of FIG. 7A provides the F2 bit in addition to its complement and which signals are fed into STROKE gates 162 and 160 respectively. By selectively enabling either of these STROKE gates, STROKE gate 165 will provide a *b* signal and one STROKE gate 166 will provide its complement $\overline{b}$ and which signal is representative of the bit read out of the frame 2 memory 30 of the associated processing element. In order to selectively choose the *a* bit or its complement, or the *b* bit or its complement, the other signals appearing on STROKE gates 148, 150, 160 and 162 must be examined. STROKE gate 148 additionally receives a C signal from the output of the arithmetic control FLIP-FLOP 178 and an SC1 signal from the central control unit 10. The output from the arithmetic control FLIP-FLOP 178 is also fed to STROKE gates 168 and 172 which respectively receives signals CM1 and CM2 from the central control unit 10. The output signal from STROKE gates 168 and 172 are respectively fed as inputs to STROKE gates 150 and 162. The arithmetic control FLIP-FLOP 178 is seen to have an LO input signal to the set side and a signal from STROKE gate 182 to the reset side. STROKE gate 182 will provide the complement of the signal from STROKE gate 184 which receives an SE1 signal from central control and an S1 signal from the output of the logic and arithmetic unit 38 shown in FIG. 7B. The C output from the arithmetic control FLIP-FLOP 178 is also fed to STROKE gate 186 which receives a MUL signal from central control 10. The signals CM1, CM2 and SE1 are utilized during multiplication or division operations and will be described hereinafter. Assume that the arithmetic control FLIP-FLOP 178 is set such that the C signal is a ONE. Assume further that both the CM1 and CM2 signals are ZEROS and it may be seen that STROKE gate 148 receives the ONE C signal, STROKE gate 150 receives the ONE signal from STROKE gate 168, STROKE gate 160 receives the ONE C signal from the arithmetic control FLIP-FLOP 178 and STROKE gate 162 receives the ONE signal from STROKE gate 172. If the SC1 signal to STROKE gate 148 is made a ONE the STROKE gate will be enabled and will pass the $\overline{ax}$ signal through such that the *a* signal produced by STROKE gate 155 will be identical to the $\overline{ax}$ signal at the input of STROKE gate 148. By making the AC1 signal a ONE, STROKE gate 150 is enabled ot pass the *ax* signal through such that the *a* signal produced by STROKE gate 155 is identical to the *ax* signal. In a similar manner, by making the SC2 signal a ONE, STROKE gate 160 is enabled such that the *b* signal produced by STROKE gate 165 will be identical to the $\overline{F2}$ signal from the FLIP-FLOP 78 of FIG. 7A, and if the AC2 signal is made a ONE, STROKE gate 162 will be enabled such that the *b* signal produced by STROKE gate 165 will be identical to the F2 signal appearing at the input of STROKE gate 162. With the *a* bit or its complement thus obtained and the *b* bit or its complement thus obtained a logic or arithmetic operation may be performed and to this end reference is now made to FIG. 7B which shows in more detail the logic and arithmetic unit 38 of FIG. 3.

Included in the logic and arithmetic unit 38 is a plurality of STROKE gates 190, 192, 194, 196, 198 and 200 the outputs of which are fed into a single STROKE gate 210, which provides the S1 signal, which signal is fed to STROKE gates 99 and 104 of the frame selection means 40 as previously described and to the STROKE gate 184 of the operation selection means 47. A carry FLIP-FLOP 220 is provided and is utilized in various arithmetic computations and includes control circuitry comprising STROKE gate 222 which receives the outputs from STROKE gates 228 and 230, to control the set side of the carry FLIP-FLOP 220, and STROKE gate 224 which controls the reset side of the carry FLIP-FLOP 220. The *a* and the $\overline{a}$ signal and the *b* and the $\overline{b}$ signal from the operation selection means 47 are fed to various STROKE gates of the logic and arithmetic unit 38 such that STROKE gate 230 receives the $a$ and $b$ signal, STROKE gate 190 receives the $\bar{a}$ and the $\bar{b}$ signal, STROKE gate 192 receives the $\bar{a}$ and the $b$ signal, STROKE 194 receives the $a$ and the $\bar{b}$ signal, STROKE gate 196 receives the $a$ and the $b$ signal, STROKE gate 198 receives the $a$ and the $b$ signal, and STROKE gate 202 receives the $\bar{a}$ and the $\bar{b}$ signal. In addition the output signal K, and its complement $\overline{K}$, from the carry FLIP-FLOP 220 are fed to various STROKE gates such that the STROKE gate 230 receives the $\overline{K}$ signal, STROKE gate 190 receives the K signal, STROKE gate 192 receives the $\overline{K}$ signal, STROKE gate 194 also receives the $\overline{K}$ signal, and STROKE gate 196 receives the K signal. STROKE gate 228 receives the C signal from the arithmetic control FLIP-FLOP 178 of FIG. 7C in addition to a CTO signal from the central control unit 10, which CTO signal, when the C signal is a ONE, will serve to set the carry FLIP-FLOP 220 by providing a ZERO output from STROKE gate 228 which causes the STROKE gate 222 to provide a ONE signal to the set side of the carry FLIP-FLOP 220. STROKE gate 230 is also operable to set the carry FLIP-FLOP 220 and the additional signals received by STROKE gate 230 is the $\overline{K}$ signal from the reset side of the carry FLIP-FLOP 220 and an AZ signal from central control. The resetting of the carry FLIP-FLOP 220 is accomplished by the STROKE gate 224 which receives the output signal from STROKE gate 190 in addition to a CL signal from the central control unit 10 which signal is normally a ONE, and when made a ZERO will reset the carry FLIP-FLOP 220. The AZ signal from the central control unit 10 which was fed to the STROKE gate 230 is additionally fed to STROKE gate 190 and STROKE gate 196. STROKE gates 192 and 194 receive an EO signal which is utilized during addition, logical EXCLUSIVE OR and other operations to be described. The AN signal to STROKE gate 198 is utilized during logical AND operations and the OR signal to STROKE gate 200 is utilized during logical INCLUSIVE OR operations.

Figure 8:
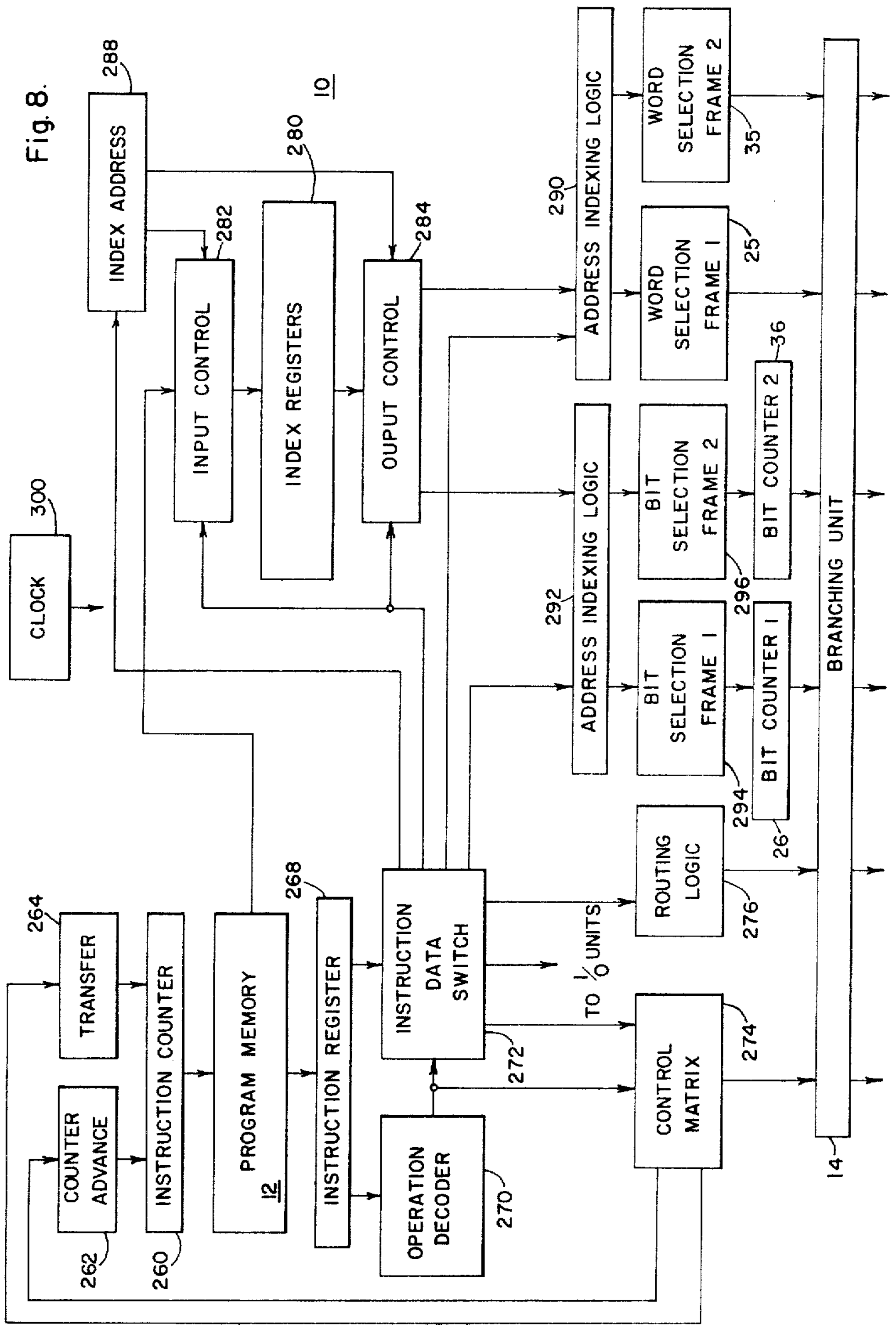
FIG. 8 is a block diagram illustrating one type of central control which may be used in the present invention.
Figure 9:
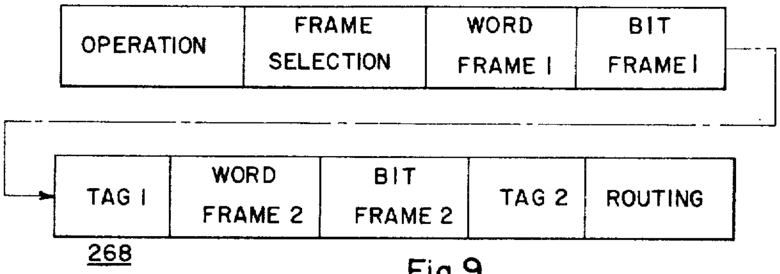
FIG. 9 is one type of instruction format which may be utilized in the present invention.

The central control unit 10 decodes commands from the program memory 12 and provides control signals in a synchronous fashion to the array of processing elements. FIG. 8 shows in block diagram form one such control system which may be utilized in the present invention. A program memory 12 is provided and contains the commands to be executed by the processing elements in addition to various data to be used by the index registers 280. The program memory 12 is addressed by the instruction counter 260 which sequentially chooses instructions in the program memory 12 upon being advanced by the counter advance 262, or chooses instructions in a non-sequential manner when commanded by the transfer unit 264. The lines connecting various units in FIG. 8 are meant to show communication between the various units and comprises a plurality of information carrying wires. Once an instruction has been designated in the program memory 12 it may be sent in parallel to the instruction register 268 where it is stored until the desired operation is carried out. An example of one type of instruction format is shown in FIG. 9 and comprises a plurality of bits with a first portion of the bits representing for example the operation to be performed. The instruction also includes a frame selection portion which governs the opertion of the frame selection means 40 in the processing element. Since each of the memory frames in the processing element comprises a plurality of multibit words, the instruction format includes a portion designating the frame 1 and the frame 2 address of the particular words involved in the operation chosen. The frame 1 word portion of the instruction selects the word in a frame 1 memory, and the frame 1 bit portion of the instruction indicates the starting bit position for the word chosen. Many electronic computers make provision for address modification by the inclusion of some type of indexing logic which generally consists of various registers which contain modifying values to be added to or subtracted from the designated address. The tag 1 portion of the instruction format of FIG. 9 may be utilized to select any one of a number of index registers whose contents will be added to the frame 1 address. The frame 2 word, frame 2 bit, and tag 2 portion of the instruction format selects a particular word and starting bit in the frame 2 memory in addition to indicating an index register whose contents are to be added to the frame 2 address. The last portion of the instruction format is the routing field which designates to which neighbor, if any, the data in the frame 1 memory are to be routed. Returning now to FIG. 8 there is provided an operation decoder unit 270 which receives the operation portion of the instruction, decodes it, and in turn sets up the instruction data switch 272 which receives the rest of the instruction. When the type of operation has been decoded by the operation decoding unit 270 the instruction data switch 272 functions to route the remaining information in the instruction to appropriate registers, counters and logic. Information from the instruction data switch 272 is sent to the control matrix unit 274 which is likewise set up by the operation decoder 270 to provide a plurality of control signals to the array of processing elements to perform the operation specified in the operation portion of the instruction. The instruction data switch 272 and the control matrix 274 may both be diode decoding matrices which are well known in the art. The routing portion of the instruction is decoded, sent to the routing logic means 276 which then generates one of the desired routing signals CV to CZ. As was mentioned, there is provided indexing logic including a plurality of index registers 280 which may contain modifying values to be added to the address portion of the instruction. The control means for these index registers 280 are provided in the form of an input control 282 and an output control 284 which is controlled by the index address unit 288. The address portion of the instruction is decoded according to the operation desired, and the word portion of the instruction is sent to the address indexing logic unit 290, and the bit portion of the instruction is sent to the address indexing logic 292 which when combined with any modification by an index register as provided by the output control 284 will set up a plurality of selection units. The frame 1 word selection unit will provide a signal to each processing element in the array defining a particular word in the frame 1 memory. The frame 2 word selection operates in a similar manner on words located in frame 2 of all the processing elements. Once the frame 1 memory bit has been selected, the bit selection unit 294 will activate the bit counter 26 which will then choose, in a predetermined sequence, bits of the selected word. The bit selection unit 296 operates in a similar manner on the bits of all the frame 2 memories. By proper programming and loading of an index register, or registers, the bit counters 26 and 36 may be made to operate such that they choose only a portion of the total bits in a selected row and thus provision is made for variable word length operations. The instruction thus decoded and the proper signals thus provided, the branching unit 14 will amplify and branch these signals to every processing element of the array. As was mentioned, in an electronic computer the signals are generally synchronized with a central clock unit which provides a sequence of pulses upon the occurrence of which operations may be performed. FIG. 8 shows such a clock means 300 and it is to be understood that the outputs from this clock unit are fed to various units of the computer and is a well-known technique.

In order to transfer information into and out of the processing element array there is provided input-output means which may be associated with a plurality of the processing elements. To this end reference is now made to FIG. 10 which shows a plurality of processing elements in the array and is intended to represent all of the processing elements. It may be seen that the processing elements located along one edge of the array, that is processing elements PE1 to PE5 communicate with an input-output means 304. As alternatives to this arrangement, the input-output means may be associated with other edge processing elements such as PE1 to PE21 on the upper edge, PE21 to PE25 on the right edge, or PE5 to PE25 on the lower edge. If the requirement for information transfer is increased in view of particular applications, higher input-output rates may be achieved by changing the square array shown to a rectangular array with the input-output means communicating with the longer edge of the array. Additionally, input means could be associated with one edge of the array and output means associated with an opposite edge of the array and in this manner information may be simultaneously fed into the processing element array at the same time as information is being read out of the array. For purposes of discussion the input-output means 304 will be assumed to have association with one edge of the processing element array and which input-output means is shown in more detail in FIG. 11.

Basically, the input-output means 304 of FIG. 11 accepts data in serial form, presents it to the array of processing elements in parallel form and is accomplished in the following manner. In a loading operation, the central control unit 10 instructs the input-output exchange and control unit 306 to accept data appearing on lines 307 and load the S buffer 308 bit-by-bit in a serial fashion. When the data are loaded into the S buffer 308 the input-output exchange and control unit 306 signals the central control which in turn signals back to dump the data from the S buffer 308 in a parallel fashion, into the input-output memory buffer 315 and this data are then located in a predetermined row of the memory buffer 315 as designated by the addressing unit 310 under control of the input-output exchange and control unit 306. The process may be repeated such that additional data are loaded into the S buffer and dumped in a parallel fashion to the second row of the memory buffer 315 and which process may be continued until all of the rows of the memory buffer 315 are filled to capacity which in the example given is five rows. The input-output memory buffer 315 may be a three dimensional core memory which would increase its storage capacity. The central control unit 10 may now instruct the P buffer 318 to accept the first bit of the words in the five rows of the input-output memory buffer 315. The P buffer 318 may then transfer these bits to each of the edge processing elements PE1 through PE5 and accept the second bit from each of the words in the input-output memory buffer 315. This sequence may be continued until all of the words in the input-output memory buffer 315 are loaded into the processing element memories and by selectively energizing the routing means 45 such that information is to be transferred to N1, the information loaded into the edge processing elements may be transferred across the array until all of the processing elements are loaded with data. When information is to be read out of the processing elements the process may be reversed. As an example, information in the edge processing elements are loaded one bit at a time to the P buffer 318 under control of the central control unit 10 and is transferred to the input-output memory buffer 315 until each line is filled. The input-output exchange and control unit 306 may then, under direction of the central control unit 10, cause each row in the input-output memory buffer 315 to transfer in a parallel fashion, the information to the S buffer to be thereafter sent to some sort of a read out system such as magnetic tape, printers, etc., and is shown generally as the display unit 320. It may be mentioned that while the S buffer is being loaded in a parallel fashion from the input-output memory buffer, information may be written into a different plane of the input-output memory buffer 315 if it is of a three-dimensional configuration. While the information in processing elements PE1 through PE5 are transferring their information to the P buffer 318, the other processing elements are simultaneously transferring information located in their associated memory to the memory of their leftmost neighbors.

The electronic computer described herein is capable of performing various commands such as input-output commands, logic commands, and arithmetic commands, to name a few. By way of example, the input-output commands may include a command for transferring information to and from the input-output means in addition to commands for shifting information across the processing element array. Typical logic commands may perform operations such as AND, OR, exclusive OR, and complementing a chosen word or bit. By way of further example, some typical arithmetic commands may perform an addition, *a* subtraction, that is, an operand *a* minus an operand *b*, an inverse subtraction, that is, an operand *b* minus an operand *a*, multiplication, division adding to zero and scaling, that is, shifting a chosen word to the right or left. The logic and arithmetic operations are performed on preselected multi-bit words located in the memory frames of the processing element and one method of extracting and rewriting information into these memory frames is demonstrated in FIG. 12.

Figure 12:
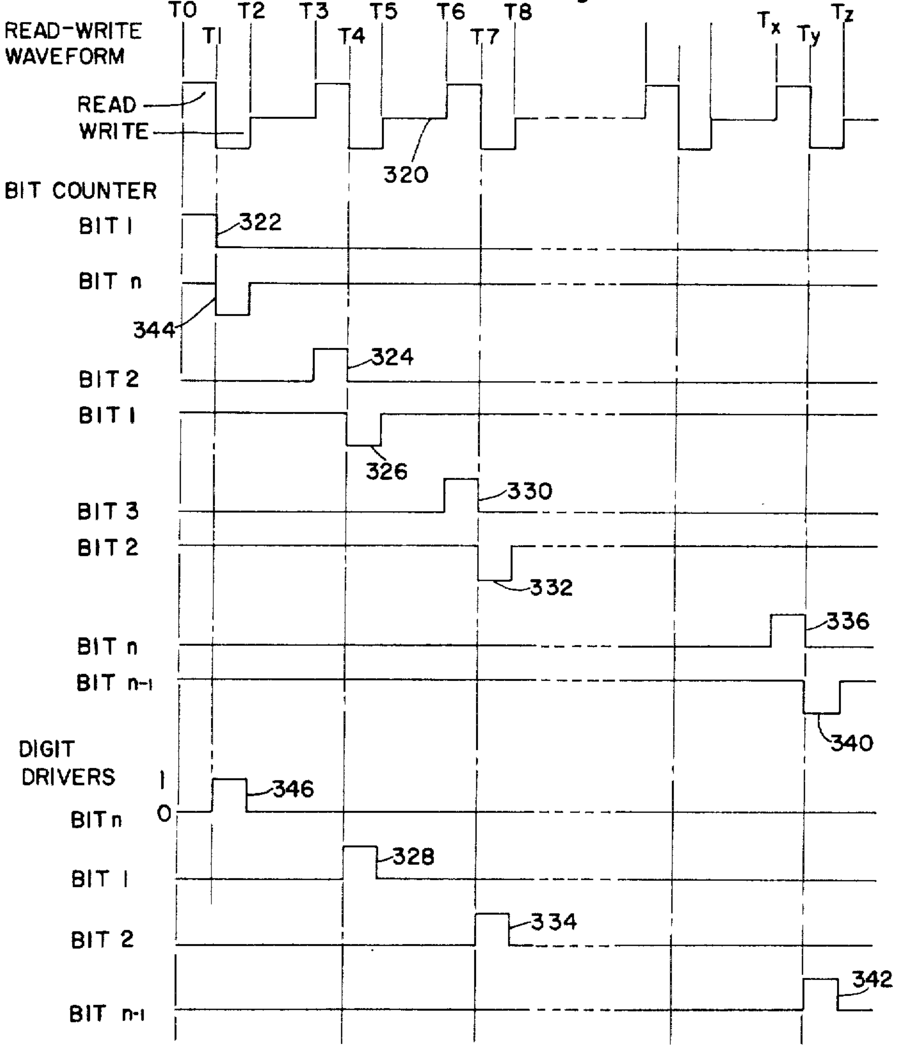
FIG. 12 illustrates wave forms associated with the memory means of each process element.

In FIG. 12 there is shown waveforms which demonstrate the reading and writing of information with respect to the frame 1 memory 20, however, the principle is equally applicable to the reading and writing of information with respect to the frame 2 memory 30. Once a preselected word has been chosen by the word selection means 25, the memory control unit 21 may be operable to supply the read-write waveform 320. It may be seen from time T0 to T1 the waveform is positive going and from time T1 to T2 the waveform is negative going. This basic wave shape is repeated at times T3, T6, etc. and the positive going portions may be considered as a read pulse while the negative going portions may be considered as a write pulse. The bit counter 26 provides a sequence of pulses to achieve the reading and writing of information and it may be seen that a positive going pulse 322 is provided during the time T0 to T1 which allows bit 1 to be read out of the frame 1 memory 20 into the write FLIP-FLOP 68. From time T1 to T3 the necessary logic or arithmetic operation is performed on the first bit and the result of that operation is then stored in the write FLIP-FLOP 74. At time T3 the bit 2 pulse 324 is operable in conjunction with the read pulse, to read the second bit from the memory. The bit counter 26 will then provide the negative going pulse 326 to write the results back into the bit 1 position in accordance with the output of the digit driver which will supply a pulse 328 from time T4 to T5, if the result of the operation was a ONE, or will supply no pulse during the time T4 to T5 if the result of the operation was ZERO. From time T4 to T6 an operation is being performed on bit 2 and at time T6 the bit counter 26 provides the positive going pulse 330 to read the third bit of the word into the write FLIP-FLOP 68, and at time T7 to T8 a negative going pulse 332 will be supplied to write the results of the operation on the second bit back into the second bit position in the word. A ONE will be written back into the bit 2 position if the digit driver supplies a pulse 334, and a ZERO will be written back into the bit 2 position if the digit driver supplies no pulse. This general scheme is followed until the last bit, bit *n* is read out of the frame 1 memory 20 at time *Tx* to *Ty* after which, the results of the operation on bit *n*-1 will be written back into the memory by virtue of the negative going pulse 340 which again will be ONE if the digit driver supplies pulse 342 from time *Ty* to *Tz*, and a zero if no pulse is supplied during times *Ty* to *Tz*. Referring back now to the negative going pulse 344, this represents the writing back into the frame 1 memory of the last bit of a previous word and is determined by the pulse 346 to write a ONE back and the lack of a pulse to write a ZERO back. The bit *n* therefore as read out by pulse 336 will have a desired operation performed upon it, and be written back after a new word has been chosen. To achieve variable word length or desired shifts in words, the bit counters, either 26 or 36, need not be started at the bit 1 position but may commence its operation at any bit starting position in accordance with an instruction which may be modified by an index register in the central control 10.

In order to demonstrate one type of arithmetic command, an addition operation will herein be described and for purposes of simplicity, the numbers 5 and 7 will be added. The number 5 in familiar binary notation is 101, and the binary notation for 7 is 111. A sum is produced in accordance with the familiar binary equation for sum which is:

$$S=\bar{a}\bar{b}K+\bar{a}b\bar{K}+a\bar{b}\bar{K}+abK$$

$$\text{carry }(K)=\bar{a}bK+a\bar{b}K+ab\bar{K}+abK$$

The number 5 (0101) may be stored in the frame 1 memory of the associated processing element or a neighboring processing element, and the number 7 (0111) may be stored in the frame 2 memory. When the add operation is decoded by the operation decoder 270 (of FIG. 8) the instruction data switch 272 and the control matrix 274 will be set up to send the proper signals to the processing elements. At the start of the operation the normally high CL signal is made a ZERO which causes the carry FLIP-FLOP 220 to be cleared such that the K bit is a ZERO and is fed to STROKE gates 190 and 196 of FIG. 7B. The AC1 signal is made a ONE thereby choosing the frame 1 bit, and not its complement; the AC2 signal is made a ONE thereby choosing the F2 bit, and to perform the necessary addition, the AZ signal to STROKE gates 230, 190 and 196 is made a ONE and the EO signal to STROKE gates 192 and 194 is made a ONE. The AN signal to STROKE gate 198 and the OR signal to STROKE gate 200 remain ZEROS and these latter STROKE gates therefore provide ONE output signals to STROKE gates 210. The first bit of each number is chosen from the respective memory frames and it may be seen that the first bit of the number 5 is a ONE and the first bit of the number 7 is a ONE, so *a* and *b* are ONES and K is a ZERO. Examining the signals on the STROKE gates of the logic and arithmetic unit 38 in FIG. 7B it may be seen that STROKE gate 190 receives the ZERO K signal and provides a ONE output to STROKE gate 210, the STROKE gate 192 receives the $\bar{a}$ signal which is a ZERO to cause STROKE gate 192 to provide a ONE output to STROKE gate 210, STROKE gate 194 receives the $\bar{b}$ signal which is a ZERO to cause a ONE output to STROKE gate 210. It may be seen therefore that the STROKE gate 210 receives all ONE signals on its input to thereby provide a ZERO output signal in accordance with the above formula for the sum. Examining now the signals on STROKE gate 230 it may be seen that the *a* signal is a ONE, the $\bar{K}$ signal is a ONE, the *b* signal is a ONE, and the AZ signal is a ONE to thereby cause STROKE gate 230 to provide a ZERO output signal to STROKE gate 222 thereby providing a ONE signal to the carry FLIP-FLOP 220 to set it such that the K bit will become a ONE, in accordance with the above formula for the carry. The second bits of each number is then read out of the respective memory frames and it may be seen that the second bit of the number 5 is ZERO ($a$) and the second bit of the number 7 is a ONE ($b$). Examining the signals from the various STROKE gates it may be seen that STROKE gate 190 receives the $\bar{b}$ signal which is a ZERO, STROKE gate 192 receives the $\bar{K}$ signal which is a ZERO, STROKE gate 194 receives the $a\bar{K}\bar{b}$ signals which are ZEROS, STROKE gate 196 receives the *a* signal which is a ZERO and STROKE gate 210 therefore receives all ONE input signals to again provide a ZERO output signal. The STROKE gate 230 receives the *a* and $\bar{K}$ signal which are both ZEROS and therefore the carry FLIP-FLOP 220 remains in its set condition providing a ONE as a carry. The third bit of each number is read out of the respective memory frames and it may be seen that the *a* bit is a ONE and the *b* bit is a ONE and by following through with the signals applied to the STROKE gates previously mentioned it may be seen that STROKE gate 196 receives all ONE input signals to thereby produce a ZERO output signal causing the STROKE gate 210 to provide a sum output signal of ONE, with the carry signal remaining a ONE. The next bit read out are both ZEROS and STROKE gates 192, 194, 196, 198, 200 all produce ONE output signals while the STROKE gate 190 receives all ONE input signals to provide a ZERO output signal causing STROKE gate 210 to provide a sum output signal of ONE. It may be seen that the ZERO output signal provided by the STROKE gate 190 is fed to STROKE gate 224 causing a ONE output signal thereby resetting the carry FLIP-FLOP 220. The sum of the addition, that is, ONE ONE ZERO ZERO (1100) is written back into either of the memory frames as determined by the CC1 and CC2 signals to the frame selection means 40 as was previously described.

Many complex mathematical operations require a multiplication process which will herein be briefly described. As is well known in binary mathematics multiplication of two operands is accomplished by a series of additions and shifts. Suppose by way of example, that a multiplier is stored in the frame 2 memory 30 and a multiplicand is stored in the frame 1 memory 20. At the start of the multiplication process the frame 2 operand, that is, the multiplier may be transferred to a special location in the frame 1 memory called the zero location which acts in essence as a holding register. The frame 2 memory then may be used to store the partial product and the transfer is accomplished by adding the frame 2 multiplier to ZERO and routing it to the zero location of frame 1. This is accomplished in the following manner: assuming that the CM1 and CM2 signals are both ZEROS, the SC1 signal to STROKE gate 148 and the AC1 signal to STROKE gate 150 are both ZEROS, and the AC2 signal to STROKE gate 162 is made a ONE thereby enabling the F2 bit to be passed through by the STROKE gate 165 as was previously described. The presence of a ZERO signal on STROKE gates 148 and 150 causes STROKE gate 155 to constantly supply a ZERO. With the logic and arithmetic means 38 of FIG. 7B set up to accomplish an addition, by making the AZ and EO signals ONE, the frame 2 operand, that is, the multiplier is effectively added to ZERO and stored in the zero location of the frame 1 memory by making the CC1 signal a ZERO and the CC2 signal a ONE. At the termination of the transfer of the multiplier to the frame 1 zero location, the CL signal to STROKE gate 224 clears the carry FLIP-FLOP 220 and the LO signal to the arithmetic control FLIP-FLOP 178 sets it so that the C output signal is a ONE. The first bit of the multiplier is read out of the zero location and is routed through the logic so as to appear at the output of STROKE gate 210 of the logic arithmetic means 38 by making the AC2 signal to STROKE gate 162 and the SC2 signal to STROKE gate 160, in addition to the SC1 signal to STROKE gate 148 all ZEROS. By making the AC1 signal to STROKE gate 150 a ONE, the multiplier bit read out may be passed through STROKE gate 155, added to ZERO, to appear as S1 which is routed back to STROKE gate 184 of the operation selection means 47, which STROKE gate also receives an SE1 signal which is made a ONE. The arithmetic control FLIP-FLOP 178 will then be set in accordance with the S1 signal. With the STROKE gate 184 enabled by the SE1 signal, if S1 is a ONE STROKE gate 184 will provide a ZERO, which will be inverted by STROKE gate 182, and the C signal from the arithmetic control FLIP-FLOP will switch to a ZERO. If S1 on the other hand is a ZERO STROKE gate 184 will provide a ONE output which is inverted by STROKE gate 182 which will not affect arithmetic control FLIP-FLOP 178 and the C output signal will remain a ONE. If the first bit of the multiplier is a ZERO, the first partial product will be all ZEROS and if the first multiplier bit is a ONE the partial product will be identical with the multiplicand. If the first bit as represented by S1 is a ZERO, the C signal is a ONE, and this signal fed to the STROKE gate 186 which also receives the enabling multiply signal MUL and will provide a ZERO output signal to STROKE gates 126, 128, 130, 132 and 140 which will block passage of any F1 signal. With the AC2 signal to STROKE gate 162 and the SC2 signal to STROKE gate 160 both being ZEROS STROKE gate 165 will always provide a ZERO signal and if successive bits of the multiplicand are read out of the frame 1 memory they will be blocked from passing through STROKE gate 142 of the routing means 45 by virtue of the blocking ZERO signal provided by STROKE gate 186. If S1 is a ONE the C signal from arithmetic control FLIP-FLOP 178 will be a ZERO and the STROKE gate 186 will provide an enabling ONE signal to the STROKE gates of the routing means 45, which will allow the multiplicand bits to be passed through, added to ZERO, and stored in the frame 2 memory location as the partial product. The MUL signal to STROKE gate 186 is then made a ZERO and the ONE signal thus provided by the STROKE gate 186 will enable the STROKE gates of the routing means 45 to pass the next multiplier bit through the logic and arithmetic means 38 to appear as the S1 output signal from STROKE gate 210, and this bit is then utilized, as before, as an input to STROKE gate 184 to thereby set up the arithmetic control FLIP-FLOP 178. The operation of the STROKE gates of the operation selection means 47 is slightly different at this time in that the AC2 signal to STROKE gate 162 is made a ONE to enable the bits of the partial product located in the frame 2 memory to be passed through by the STROKE gate 165 to be thereby added to ZERO if the second bit of the multiplier is ZERO, or to be added to the multiplicand if the second bit of the multiplier is a ONE. To effect the aforementioned shift, the second bit of the partial product is started first and is routed at the same time as the first bit of the multiplicand. This general scheme of shifting and adding the partial product to the multiplicand, if the multiplier bit is ONE, or to ZERO if the multiplier bit is ZERO is continued until a total product is obtained. If one or both of the numbers being multiplied are negative, the multiplication may be carried out as described above and after which a correction cycle may be entered into to determine the proper sign of the product.

Accordingly there has been provided an electronic computer having a plurality of similar processing elements all under simultaneous control of a central control unit. The computer is able to load and extract information at faster rates by virtue of the input-output scheme disclosed herein. In addition, the novel processing element provided, makes the computer more flexible and capable, in the solution of complex mathematical operations.

Although the present invention has been described with a certain degree of particularity, it should be understood that the present disclosure has been made by way of example and that changes in the combination and arrangement of parts obvious to one skilled in the art, may be resorted to without departing from the scope and spirit of the invention.

What I claim is:

1. A computer comprising:

(1) a central control means;

(2) a plurality of similar processing elements arranged in a geometric array including at least one side, each said processing element being under simultaneous control of said central control means with each processing element possessing means for communicating with other preselected processing elements in said array; and (3) input-output means associated with the processing elements along said side of said array for transferring information to and from the processing elements along said side, said last named processing elements being operable to transfer information to and from next adjacent processing elements.

2. A computer comprising:

(1) a central control means;

(2) an array of similar processing elements all under simultaneous control of said central control means;

(3) each said processing elements possessing (a) a first and second multiword memory frame, (b) logic and arithmetic means for performing logic and arithmetic operations on information stored in said memory frames, (c) means for selectively routing information stored in at least one of said memory frames to the logic and arithmetic means of preselected other processing elements in said array, and (d) frame selection means for transferring information between said memory frames and additionally operable to store the results of any of said logic and arithmetic operations in a preselected one of said memory frames; and (4) input-output means associated with a plurality of said processing elements of said array for transferring information to and from said processing elements.

3. A computer comprising:

(1) a central control means;

(2) an array of similar processing elements each operable to receive identical control signals from said central control means;

(3) each said processing elements possessing (a) a first and second multiword memory frame, (b) logic and arithmetic means for performing logic and serial by bit arithmetic operations on the bits of the words stored in said memory frames, (c) means for routing information stored in at least one of said memory frames to the logic and arithmetic means of a preselected other processing element in said array, and (d) frame selection means operable in response to a first control signal from said central control means to transfer information between said memory frames, operable in response to a second control signal from said central control means to store the results of any of said logic and arithmetic operations in said first memory frame and rewrite information into said second memory frame, and operable in response to a third control signal from said central control means to store said results in said second memory frame and rewrite information into said first memory frame; and (4) input-output means associated with the processing elements on an edge of said array for transferring information to and from said processing elements.

4. A computer comprising:

(1) a central control means;

(2) an array of processing elements all operating in common and each operable to receive identical control signals from said central control means;

(3) each said processing elements processing (a) a first and second memory frame for storing a plurality of multibit words, (b) a first buffer unit for storing at least one bit read from said first memory frame and at least one bit to be written back into said first memory frame, a second buffer unit for storing at least one bit read from said second memory frame and at least one bit to be written back into said second memory frame, (c) logic and arithmetic means for performing logic and serial by bit arithmetic operations, (d) routing means for transferring information from one of said first or second buffer units to the logic and arithmetic means of its associated processing element or to the logic and arithmetic means of a neighboring processing element in said array, (e) frame selection means for transferring information between said first and second memory frames via said first and second buffer units and additionally operable to direct the results of any of said operations to a preselected one of said first and second memory frames via said first or second buffer units, and (4) input-output means connected to a plurality of processing elements of said array for transferring information to and from the memory frames of said processing elements.

5. A computer comprising:

(1) a central control means;

(2) an array of processing elements all operating under simultaneous control of said central control means;

(3) each processing element possessing (a) a first and second memory frame, (b) logic and arithmetic means for performing logic and serial by bit arithmetic operations, (c) routing means for transferring information from at least one of said first or second memory frames to the logic and arithmetic means of its associated processing element or to the logic and arithmetic means of a preselected other processing element in said array, (d) selection means for gating bits, or their complements, from said first and second memory frames to said logic and arithmetic means, and (e) frame selection means for transferring and routing information to said first and second memory frames; and (4) input-output means connected to a predetermined plurality of processing elements of said array for loading and receiving information from at least one of said memory frames.

6. A computer comprising:

(1) a central control means;

(2) an array of similar processing elements all under simultaneous control of said central control means;

(3) each processing element possessing (a) memory means, (b) logic and arithmetic means for performing predetermined logic and arithmetic operations on information stored in said memory means, (c) means for transferring information located in said memory means to a preselected other processing element in said array;

(4) input-output means connected to a plurality of processing elements along a predetermined portion of said array for loading and extracting information to and from said processing elements.

7. A computer comprising:

(1) a central control means;

(2) an array of similar processing elements all under simultaneous control of said central control means;

(3) each processing element possessing (a) memory means, (b) logic and arithmetic means for performing predetermined logic and arithmetic operations on information stored in said memory means, (c) means for transferring information located in said memory means to a preselected other processing element in said array;

(4) input-output means connected to a plurality of processing elements along a predetermined portion of said array for loading and extracting information to and from said plurality of processing elements;

(5) said input-output means including memory buffer means, a first buffer unit for receiving and sending data in a serial by bit fashion, an exchange and control unit for transferring said data, in a parallel fashion, between said first buffer unit and said memory buffer means, and a second buffer unit for transferring said data between said memory buffer means and said plurality of processing elements.

8. A processing element for use in a computer comprising:

(1) first and second memory means for storing a plurality of multibit words;

(2) buffer means for temporarily storing bits of words to be read out of and written into said first and second memory mens;

(3) logic and arithmetic means for performing logic operations and arithmetic operations in a serial-by-bit fashion;

(4) operation selection means for choosing desired bits, or their complements, to be operated upon by said logic and arithmetic means;

(5) means for transferring information between said first and second memory means or for storing the results of any logic or arithmetic operation in a preselected one of said memory means; and (6) routing means for accepting external data or data from at least one of said memory means.

References Cited by the Examiner

UNITED STATES PATENTS 3,200,380 8/1965 MacDonald et al. --- 340—172.5

OTHER REFERENCES

Automatic Control Magazine, December 1959, Reprint of article by Stanley K. Chao and Gerard Rocheleau, Title—"Duplexing Mobidic Computers."

ROBERT C. BAILEY, *Primary Examiner.*

G. D. SHAW, *Assistant Examiner.*